United States Patent
Johnson et al.

(10) Patent No.: US 11,458,591 B2
(45) Date of Patent: Oct. 4, 2022

(54) SURFACE MODIFICATION USING ABRASIVE BLASTING

(71) Applicant: ROLLS-ROYCE plc, London (GB)

(72) Inventors: Charles R H Johnson, Ashby-de-la-Zouch (GB); Grant J. Gibson, Derby (GB)

(73) Assignee: Rolls-Royce plc

( * ) Notice: Subject to any disclaimer, the term of this patent is extended or adjusted under 35 U.S.C. 154(b) by 1084 days.

(21) Appl. No.: 16/104,502

(22) Filed: Aug. 17, 2018

(65) Prior Publication Data

US 2019/0054595 A1     Feb. 21, 2019

(30) Foreign Application Priority Data

Aug. 18, 2017 (GB) .................................... 1713300

(51) Int. Cl.
| | |
|---|---|
| *B24C 11/00* | (2006.01) |
| *B24C 1/10* | (2006.01) |
| *B24C 1/08* | (2006.01) |
| *B33Y 40/00* | (2020.01) |
| *B22F 10/20* | (2021.01) |
| *B22C 9/18* | (2006.01) |
| *B29C 67/04* | (2017.01) |
| *B22F 3/24* | (2006.01) |

(Continued)

(52) U.S. Cl.
CPC ............... *B24C 11/00* (2013.01); *B22C 9/18* (2013.01); *B22F 10/20* (2021.01); *B24C 1/08* (2013.01); *B24C 1/10* (2013.01); *B29C 67/04* (2013.01); *B33Y 40/00* (2014.12); *B22F 5/009* (2013.01); *B22F 5/04* (2013.01); *B22F 2003/247* (2013.01); *B22F 2998/10* (2013.01); *B24C 1/006* (2013.01); *B33Y 10/00* (2014.12)

(58) Field of Classification Search
CPC ......... B24B 57/00; B24B 57/02; B24B 57/04; B24C 1/10
USPC .................................. 451/38, 28, 34, 39, 55
See application file for complete search history.

(56) References Cited

U.S. PATENT DOCUMENTS

2001/0047675 A1* 12/2001 Arola ........................ B24C 1/10
                                                                      72/53
2002/0098776 A1* 7/2002 Dopper .................... B24C 1/06
                                                                     451/38

(Continued)

FOREIGN PATENT DOCUMENTS

DE           10146787 A1    1/2003
DE     102011055104 A1 *   5/2013  ............... B24C 1/10

(Continued)

OTHER PUBLICATIONS

Great Britain Search Report dated Feb. 9, 2018, issued in GB Patent Application No. 1713300.0.

*Primary Examiner* — Joel D Crandall
(74) *Attorney, Agent, or Firm* — Barnes & Thornburg LLP

(57) ABSTRACT

A method for the manufacture of a component comprises the following steps, in sequence using an additive layer manufacturing process to build a three-dimensional net shape of the component; performing a first abrasive blasting operation on a region of a surface of the component; and performing a second abrasive blasting operation on the region. The angle of incidence of the abrasive on the surface in the first abrasive blasting operation is less than the angle of incidence of the abrasive on the surface in the second abrasive blasting operation.

8 Claims, 4 Drawing Sheets

(51) Int. Cl.
  *B22F 5/04*    (2006.01)
  *B22F 5/00*    (2006.01)
  *B33Y 10/00*   (2015.01)
  *B24C 1/00*    (2006.01)

(56) References Cited

U.S. PATENT DOCUMENTS

| | | | |
|---|---|---|---|
| 2006/0101883 A1* | 5/2006 | Garza | B24C 1/10 |
| | | | 72/53 |
| 2006/0111023 A1* | 5/2006 | Kamimura | B24C 11/00 |
| | | | 451/75 |
| 2007/0175030 A1* | 8/2007 | Luna | B23P 9/02 |
| | | | 29/889.2 |
| 2012/0043044 A1 | 2/2012 | Mase | |
| 2013/0125600 A1 | 5/2013 | Kobayashi et al. | |
| 2014/0079540 A1* | 3/2014 | Morris | B22F 5/04 |
| | | | 29/889.22 |
| 2016/0375538 A1* | 12/2016 | Lambourne | B24B 1/005 |
| | | | 451/5 |

FOREIGN PATENT DOCUMENTS

| | | |
|---|---|---|
| EP | 1813686 A1 | 8/2007 |
| EP | 3132873 A1 | 2/2017 |
| TW | 602564 | 9/2002 |
| TW | 201706116 | 2/2017 |

\* cited by examiner

SURFACE MODIFICATION USING ABRASIVE BLASTING

CROSS-REFERENCE TO RELATED APPLICATIONS

This application is based upon and claims the benefit of priority from British Patent Application No. GB 1713300.0, filed on 18th of August 2017, the entire contents of which are herein incorporated by reference.

BACKGROUND

Technical Field

The present disclosure concerns the manufacture of an engineering component, for example a component of a gas turbine engine. More particularly, a method of manufacture involving an additive layer manufacturing (ALM) step and abrasive blasting steps is described.

Description of the Related Art

Additive layer manufacturing (ALM) techniques are known for use in forming components with complex geometries and can be used as an alternative to casting. In ALM techniques, a component is built up layer by layer onto a base plate until the 3D component is defined. In some ALM methods, layers are created by selective treatment of layers within a mass of particulate material, the treatment causing cohesion of selected regions of particulates into a solid mass. For example, the particulate material is a ferrous or non-ferrous alloy powder and the treatment involves local heating using a laser or electron beam. Specific examples of ALM methods include (without limitation): laser sintering, laser melting, direct laser deposition (DLD), and electron beam melting (EBM).

FIG. 2 shows schematically a known additive layer manufacturing method. In the described method, a component is manufactured from a high-temperature alloy by a Powder Bed Direct Laser Deposition (PB DLD) or Direct Metal Laser Sintering (DMLS) additive manufacturing process. A powder bed 1 is raised into the path of a spreading device 2 which spreads a thin layer of powder across a base-plate 3. The base-plate typically comprises a tool steel. Selected regions of the powder corresponding to a shape which it is intended to build are fused together (and also to the base-plate) by heat from laser 4. The base-plate 3 is gradually lowered with respect to the laser during the process enabling layer upon layer of powder to be applied and sintered by the laser. This layering process can create one or more components simultaneously.

When a high performance engineering component (for example, a component of a gas turbine engine) is to be made by ALM, further treatment steps are often necessary to address porosity and/or weaknesses in the component surface. Such porosity or weakness might result in failure of the component under high pressure, high stress and/or high temperature conditions. An example of such a treatment step is a blasting or peening step, which is used to impart a compressive stress into the surface layer of the component. This compressed layer imposes a compressive force on the underlying material, which helps to resist the propagation of cracks in the component. In particular, this helps to prevent the generation and propagation of macro-cracks during a subsequent HIP or heat treatment process.

The HIP process substantially eliminates micro-cracks in the material structure, so improving the properties of the component material. This is a particularly important step for high-temperature nickel alloys (often used in the manufacture of gas turbine engine components), which when produced by DLD alone are very susceptible to cracking due to high micro-porosity and residual stresses in the component. The HIP step compresses the component whilst heating it.

A disadvantage of additive layer manufacturing, however, is that it produces components with a rougher surface finish than is achievable with conventional (subtractive) manufacturing methods. A particular problem is that random semi-sintered particles may be adhered to the component surface, and these can block the media stream from impacting the surface during a subsequent blasting or peening operation. It is therefore common to perform a machining operation on an as-manufactured ALM component to homogenise its surface, before the blasting or peening operation.

Such machining operations can be expensive and time-consuming. Furthermore, the design freedoms afforded by ALM allow designers to create ever more complex component geometries, and (because of the physical and mechanical limitations of machining tools) creating machining tool paths or alternative surface finishing techniques for such component geometries will become increasingly difficult.

It would therefore be desirable to have a method for the manufacture of a component using an additive layer manufacturing process that mitigates or overcomes the above problems.

SUMMARY

According to a first aspect there is provided a method for the manufacture of a component, the method comprising, in sequence:

a. using an additive layer manufacturing process to build a three-dimensional net shape of the component b. performing a first abrasive blasting operation on a region of a surface of the component; and c. performing a second abrasive blasting operation on the region;

the method characterised in that the angle of incidence of the abrasive on the surface in the first abrasive blasting operation is less than the angle of incidence of the abrasive on the surface in the second abrasive blasting operation.

The first abrasive blasting operation acts principally to homogenise the surface of the region. The second blasting operation acts to impart a compressive stress into the region. Because the surface has been homogenised by the first operation, the compressive stress imparted by the second operation is more uniform.

The first abrasive blasting operation may act to remove asperities from the region. The removal of asperities from the region improves the smoothness of the surface.

The asperities may comprise semi-sintered particles adhered to the surface. The presence of such particles is a known consequence of additive manufacture processes. Such particles can block the media from reaching the surface of the region during the second blasting operation, thereby preventing the compressive stress from being imparted effectively.

The first abrasive blasting operation may act to remove material carrying residual tensile stress from the region. If a compressive stress is applied to material carrying a residual tensile stress, the resultant compressive stress will be reduced. The component will then be less resistant to cracking during subsequent processing.

The second abrasive blasting operation may act to impart compressive stress into the region. This compressive stress imposes a compressive force on the underlying material, which helps to resist the propagation of cracks in the component. In particular, this helps to prevent the generation and propagation of macro-cracks during a subsequent HIP or heat treatment process.

The second blasting operation preferably causes no significant material removal from the surface. This improves the consistency of the final component and its compliance with the design requirement.

The region may be substantially the entire surface of the component. The presence of a compressive stress over the whole surface of the component will maximise the resistance to cracking during subsequent operations.

The first and second abrasive blasting operations may be performed using the same apparatus and abrasive. The blasting operations are considerably simplified if the same apparatus and abrasive can be used for both, and only the angle of the delivery nozzle changed.

The angle of incidence of the abrasive on the surface region in the second abrasive blasting operation may be between 60 and 90 degrees; preferably between 30 and 75 degrees; and more preferably between 45 and 60 degrees. This optimises the imparting of compressive stress into the surface region while minimising further material removal.

The angle of incidence of the abrasive on the surface region in the first abrasive blasting operation is between 10 and 75 degrees; and preferably between 75 and 90 degrees. This ensures effective removal of asperities and semi-sintered particles, without causing unpredictable and undesirable damage to the surface region.

DESCRIPTION OF THE DRAWINGS

Embodiments will now be described by way of example only, with reference to the Figures, in which.

DETAILED DESCRIPTION

Figure 1:
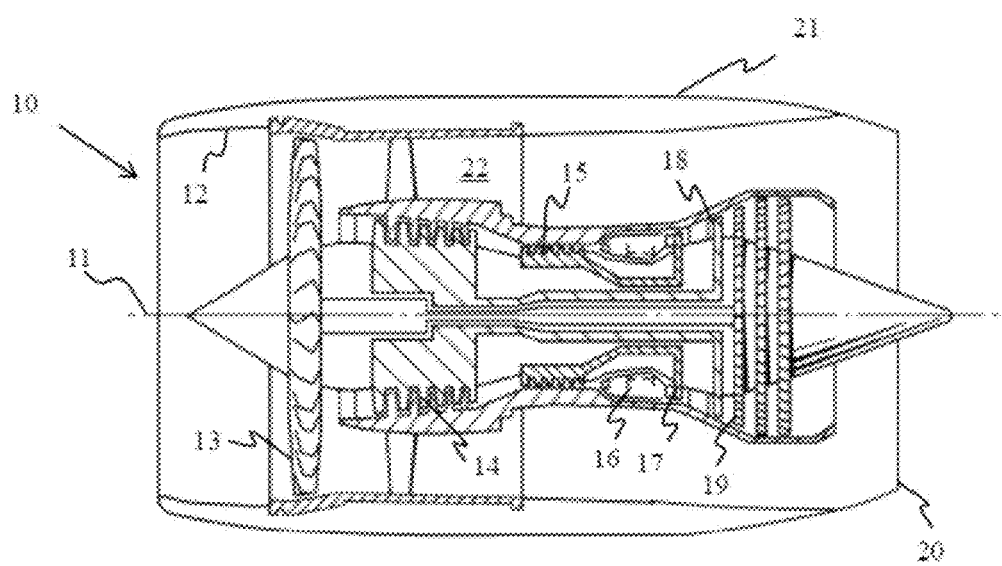
FIG. 1 is a sectional side view of a gas turbine engine which may comprise components made in accordance with the method of the invention.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Many components of the gas turbine engine could be manufactured by the method of the invention. For example (but without limitation), components in the turbine sections 17, 18 and 19, or the combustor 16 may be manufactured in accordance with the invention. The method is well suited to the manufacture of components with non-linear geometries.

Figure 2:
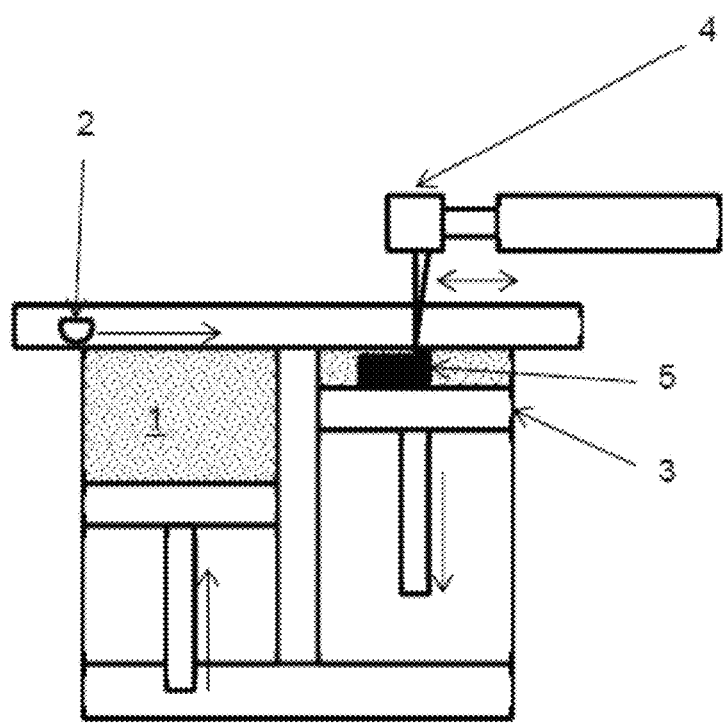
FIG. 2 shows schematically an additive layer manufacturing method known to be used in prior art manufacturing.

FIG. 2 has been discussed above.

Figure 3:
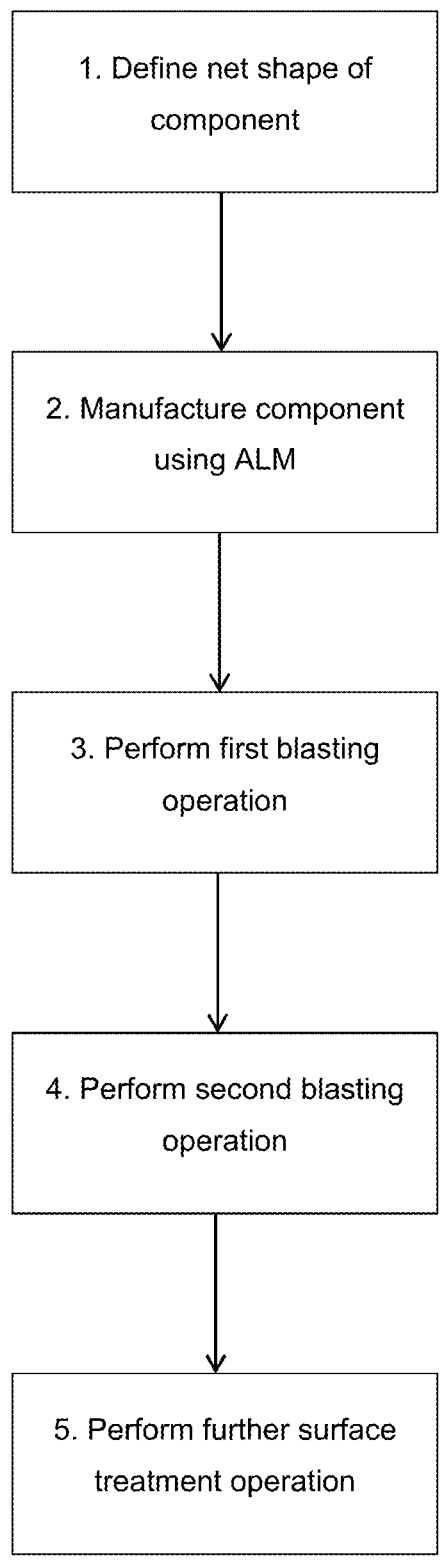
FIG. 3 is a flow chart illustrating the steps in a method in accordance with one embodiment of the invention.

FIG. 3 is a flowchart illustrating a method for the manufacture of a component in accordance with one embodiment of the invention.

In the first step shown in the flowchart, the net shape of the component to be produced is defined in known manner and loaded into the ALM system.

Figure 4:
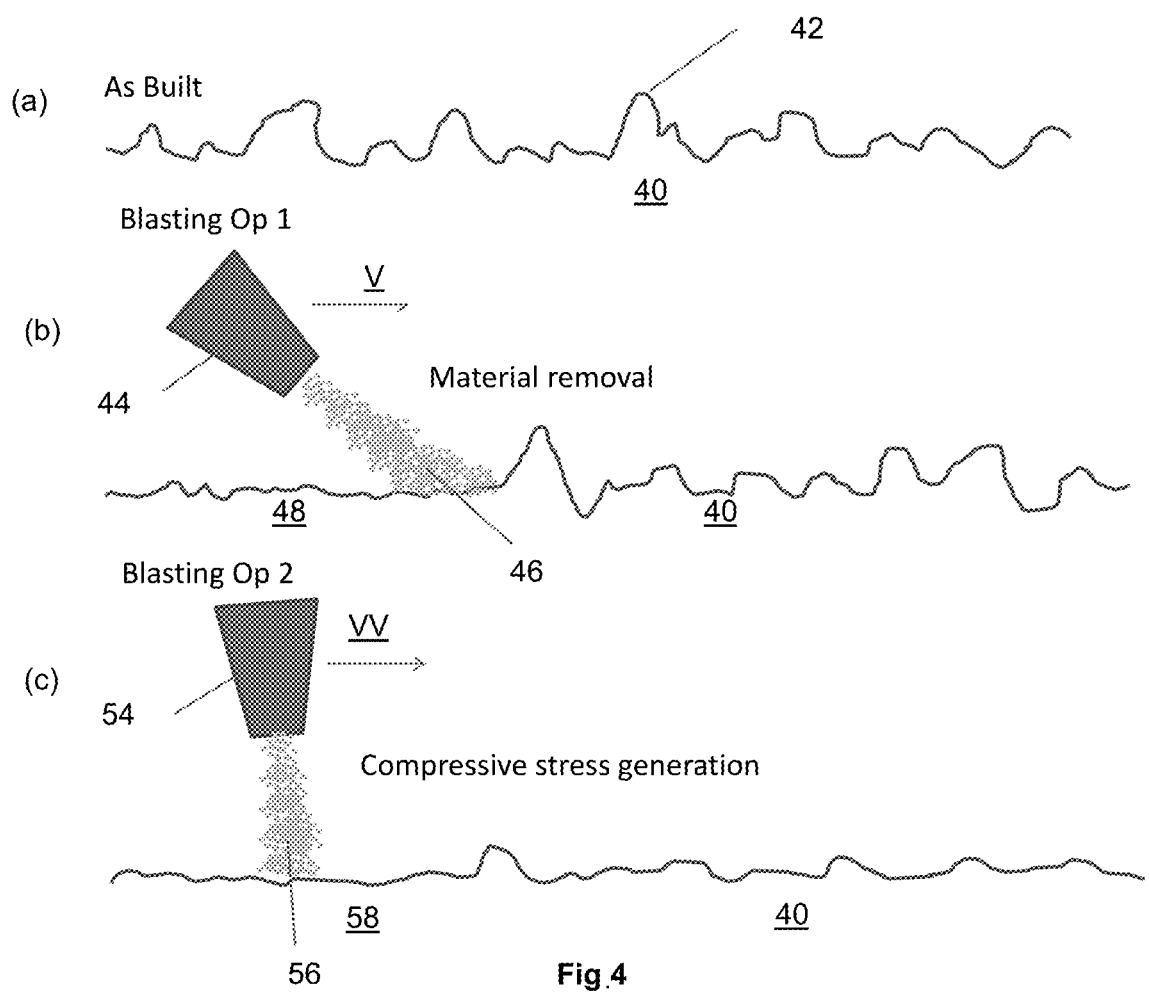
FIG. 4 shows schematically (a) the as-manufactured surface of the component made in accordance with FIG. 3; (b) the effect of the first blasting operation of FIG. 3; and (c) the effect of the second blasting operation of FIG. 3.

In the second step shown in the flowchart, the component is manufactured by ALM in accordance with the definition. As described above, the as-manufactured component has a relatively rough surface finish, illustrated schematically in FIG. 4(a). The surface 40 of the component has numerous asperities 42, in particular caused by random semi-sintered particles adhering to the component surface. As a consequence of the manufacturing process, there may also be material close to the surface 40 carrying residual tensile stress which is undesirable.

In the third step shown in the flowchart, a first blasting operation is performed. As illustrated in FIG. 4(b), a nozzle 44 of a blasting apparatus (not shown) has an angle of incidence of 45 degrees to the surface 40 of the component. The blasting apparatus is configured to traverse the nozzle 44 in the direction of the arrow V at a predetermined traverse speed. The nozzle delivers a jet of abrasive 46 towards the surface 40, also at an angle of 45 degrees to the surface 40.

The angle of delivery of the abrasive 46 causes it to remove material from the surface 40, in particular to remove random semi-sintered particles and material carrying residual tensile stress. The portion 48 of the surface that has been treated by the first blasting operation therefore has a smoother and more homogenous surface finish than the untreated surface 40. It is anticipated that acceptable material removal will be obtained with nozzle angles of incidence between 10 and 75 degrees. Preferably, the nozzle angle of incidence will be between 30 and 75 degrees. More preferably, the nozzle angle of incidence will be between 45 and 60 degrees.

In the fourth step shown in the flowchart, a second blasting operation is performed. As illustrated in FIG. 4(c), a nozzle 54 of a blasting apparatus (not shown) has an angle of incidence of 90 degrees to the surface 40 of the component (i.e. perpendicular to the surface 40). The blasting apparatus is configured to traverse the nozzle 54 in the direction of the arrow VV at a predetermined traverse speed, which may be the same as or different from the traverse speed in the previous step. The nozzle delivers a jet of abrasive 56 towards the surface 40, also at an angle of 90 degrees to the surface 40.

The angle of delivery of the abrasive 56 causes it to impart a compressive stress into the surface region 58 of the component, without causing significant material removal. The magnitude of the compressive stress is proportional to v.sin θ, where v is the speed of the abrasive within the jet and θ is its angle of incidence. It is anticipated that an angle of incidence between 60 degrees and 90 degrees will be suitable for this blasting operation. Preferably, the angle of incidence will be between 75 and 90 degrees.

Preferably, the nozzle is movable so that its angle of incidence can be changed. This allows the blasting apparatus of FIGS. 4(*b*) and 4(*c*) to be the same apparatus, and the nozzles 44 and 54 to be the same nozzle. It also allows the nozzle angle to be changed dynamically as the nozzle is traversed over the surface of the component, to ensure that the angle of incidence of the nozzle—relative to the component surface—can be kept constant throughout each of the first and second blasting operations, so that the whole surface of the component can be treated. In this way, the whole surface of the component can first be homogenised, and then be provided with a uniform compressive stress; thereby minimising the chance of any cracking during a subsequent HIP process.

By using two abrasive blasting operations, and particularly by using the same apparatus and abrasive for both operations, the surface finish of the component can be improved and a compressive stress imparted into its surface in a simpler manner than by known methods. The need for a separate and costly machining step is removed. Furthermore, the method of this disclosure is more suitable for complex geometries of the type facilitated by ALM techniques.

Any suitable blasting medium may be used; for example, but not limited to, ceramic, glass, metal.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method for the manufacture of a component, the method comprising, in sequence:
   a. using an additive layer manufacturing process to build a three-dimensional net shape of the component;
   b. performing a first abrasive blasting operation on a region of a surface of the component; and
   c. performing a second abrasive blasting operation on the region thereby removing a minimal amount of material from the component, the minimal amount of material being less than an amount of material removed by the first abrasive blasting operation;
   wherein an angle of incidence of the abrasive on the surface in the first abrasive blasting operation is between 30 and 60 degrees, and
   wherein an angle of incidence of the abrasive on the surface in the second abrasive blasting operation is between 60 and 90 degrees.

2. The method of claim 1, in which the first abrasive blasting operation acts to remove asperities from the region.

3. The method of claim 2, in which the asperities comprise semi-sintered particles adhered to the surface.

4. The method of claim 1, in which the first abrasive blasting operation acts to remove material carrying residual tensile stress from the region.

5. The method of claim 1, in which the second abrasive blasting operation acts to impart compressive stress into the region.

6. The method of claim 1, in which the region is an entire surface of the component.

7. The method of claim 1, in which the first and second abrasive blasting operations are performed using the same apparatus and nozzles, and the same abrasive material.

8. The method of claim 1, in which the angle of incidence of the abrasive on the surface region in the second abrasive blasting operation is between 75 and 90 degrees.

* * * * *